US 8,140,662 B2

(12) United States Patent
Curran-Gray et al.

(10) Patent No.: US 8,140,662 B2
(45) Date of Patent: Mar. 20, 2012

(54) COMMUNICATIONS NETWORK ELEMENTS AND METHODS OF MONITORING COMMUNICATIONS NETWORKS

(75) Inventors: Martin Curran-Gray, Fife (GB); Andrew Robert Lehane, Kinross-shire (GB)

(73) Assignee: Agilent Technologies, Inc., Santa Clara, CA (US)

( * ) Notice: Subject to any disclaimer, the term of this patent is extended or adjusted under 35 U.S.C. 154(b) by 1747 days.

(21) Appl. No.: 10/972,154

(22) Filed: Oct. 22, 2004

(65) Prior Publication Data

US 2005/0120110 A1 Jun. 2, 2005

(30) Foreign Application Priority Data

Oct. 30, 2003 (GB) .................................... 0325307.7

(51) Int. Cl.
*G06F 15/16* (2006.01)
(52) U.S. Cl. ......... 709/224; 709/223; 709/226; 709/227
(58) Field of Classification Search .................. 709/224, 709/250–252
See application file for complete search history.

(56) References Cited

U.S. PATENT DOCUMENTS

| 5,764,076 A * | 6/1998 | Lee et al. ........................ 326/38 |
| 5,793,753 A * | 8/1998 | Hershey et al. ................ 370/252 |
| 7,236,455 B1 * | 6/2007 | Proudler et al. ............... 370/230 |
| 2005/0074013 A1 * | 4/2005 | Hershey et al. .......... 370/395.51 |
| 2007/0140231 A1 * | 6/2007 | Deng ............................ 370/386 |

FOREIGN PATENT DOCUMENTS

| EP | 0474932 A1 | 3/1992 |
| EP | 01152570 A1 | 11/2001 |
| WO | WO 9812828 A1 | 3/1998 |

OTHER PUBLICATIONS

Mario Baldi et al, Exploiting Code Mobility in Decentralized and Flexible Network Management, Proc. of the First International Workshop on Mobile Agents, Berlin, Germany, Apr. 1997, pp. 1-14.
David M. Chess, Security Issues in Mobile Code Systems, Published in Mobile Agents and Security, LNCS 1419, pp. 1-14, 1998.
A. Liotta et al, Efficient Network Monitoring Using Mobile Agents, Research Note, Department of Computer Science, University College London [RN/99/6], London, UK, Jan. 1999, pp. 1-20.
Aviel D. Rubin, Mobile Code Security, IEEE Internet Computing, vol. 2, Issue 6, Nov. 1998, pp. 30-34.
EP Search Report, Feb. 20, 2004.

* cited by examiner

*Primary Examiner* — Jeffrey Pwu
*Assistant Examiner* — Sulaiman Nooristany

(57) ABSTRACT

A network element is provided with the capability to perform monitoring and/or measurement functions on the element and the network of which it is a part. The monitoring/measurement functionality is implemented by programmable devices to enable the functionality to be modified and updated without removing the network element from service.

8 Claims, 5 Drawing Sheets

COMMUNICATIONS NETWORK ELEMENTS AND METHODS OF MONITORING COMMUNICATIONS NETWORKS

This invention relates to communications network elements and methods of monitoring communications networks.

BACKGROUND ART

The rapid expansion in volume of traffic carried over communications networks, in the form both of voice and other data signals, has resulted in continuing developments in communications hardware (e.g. optical systems carrying multiple wavelength signals at increasing symbol rates) and software (e.g. new systems and protocols such as GPRS, 3G mobile telephony, IPv6 and Mobile IP). The commercial needs to provide reliable, high quality communications services as cost-effectively as possible have resulted in the widespread incorporation in communications networks of devices for monitoring a wide variety of operational parameters. These parameters include basic indicators of proper functioning, such as bit error rate and jitter, as well as indicators of more user-oriented quality of service.

As new developments in hardware and software are incorporated into service-providing networks, the monitoring systems must likewise be updated. Design of monitoring and measurement tools for communication networks has to contend with two challenges: the very wide scope of the information to be measured, and changes and developments in the required types of measurement. Developing and producing tools that can measure 'everything', whether simultaneously or separately is a costly, long and arduous task. For example, current measuring instruments and monitoring probes must be pre-programmed with all of the measurements they are likely to need during their operational lifetime (to the extent these can practicably be foreseen). However, during typical use a particular user will often require only one or two key measurements from the suite provided by the equipment. Much of the measurement functionality will therefore lie dormant and unused. The list of protocols that must be supported by measurement systems is large and constantly increasing, and the number of applications and types of events that occur and must be monitored within communication networks is also very fluid. As a consequence, measurement and monitoring systems can quickly become out of date and require modification and modernization at an alarming rate.

A system that has the potential to support a variety of measurements for a large disparate customer base using many different protocols will require a great deal of code storage and therefore by its very nature be expensive to produce. A high level of flexibility is valuable in providing lower-cost targeted measurements. Measurement solutions based primarily on software controlling commodity hardware, such as standard general-purpose personal computers (PCs), can provide a highly flexible design. Typically some form of filtering is performed (e.g. by dedicated programs that run at a low level within the operating system of the device) on network traffic captured via a network interface. The filtered data are passed to measurement software modules running at higher levels of the operating system. New protocols and measurements can easily be added through software upgrades. It is also possible to store large suites of measurements on the main storage (e.g. magnetic hard disk) of such a device.

Unfortunately although commodity hardware is highly flexible it typically does not provide the performance required to monitor the very high (multi-gigabits per second) line speeds of current and emerging communication link technologies. Nor is commodity hardware compact, easily deployed, power efficient and cheap enough to be ubiquitous.

Conversely, a dedicated hardware-only solution typically has sufficient performance to measure high-speed links, but generally lacks flexibility. Hardware-based solutions are very difficult to change after they have been manufactured. At the very least such hardware must generally be returned to the factory or a service outlet for upgrading and installation of new protocols or additional measurements.

Hybrid approaches attempt to resolve this dilemma by selecting the most appropriate hardware and software components for the task at hand. However, these tend to be even more costly. A solution that contains the best software and hardware options is inherently less cost-effective. This hybrid approach also suffers the same constraints as predominantly software-based systems, i.e. power inefficiency, cost, heat dissipation and large physical size.

Most existing measuring and monitoring solutions provide a wide range of of real-time measurement features. But owing to space, size, and cost implications, few users can afford to have many of them placed at all the points where they consider it likely that their functions may be needed. To make best use of limited resource the devices must therefore be transported around the network as required.

A solution is highly desirable that delivers the optimum amount of measurement capability to perform the particular analysis the user desires, on the specific data the user wishes to analyze, just when the user requires it, without sacrificing functionality. Flexibility therefore continues to be of paramount importance. However, measurement systems will, by necessity, become more hardware oriented: recent massive increases in link speeds make this inevitable. Dedicated hardware offers the opportunity to re-design probes so that costs, scale, data rate and heat dissipation issues can be addressed.

Partly as a result, it is very likely that measurement and monitoring functionality will be incorporated into network elements such as routers, switches, servers, DSL/ADSL/cable modems, firewall units, private branch exchanges (PBXs) and media gateways. One example that has already been proposed by Agilent Technologies, Inc. involves incorporating measurement functionality in a router's line cards—see European patent application EP 1 152 570. Embedding measurement functionality in network equipment has the added advantage that measurements can become pervasive: anywhere and at anytime. The associated devices have a small physical footprint, consume little power and could be relatively inexpensive. This presents a very powerful set of features that could make large-scale measurement of the operation of systems such as the Internet a realistic possibility.

Unfortunately, even with rapid advances in hardware design, embedded devices are unlikely to have spare storage capacity to be pre-programmed with a large variety of measurements to suit many purposes. The cost effective utilization of the limited resources possessed by an embedded device is therefore critical. Furthermore, as new protocols and applications are developed a mechanism to upgrade the embedded devices without removing them from service (e.g. to be taken back to the factory or to a service point) will be highly desirable. Network operators and users are unlikely to tolerate a lengthy loss of service whilst units are sent away to be upgraded. Some of these issues could in principle be addressed by on-site servicing or 'hot-swapping' of the network elements in which the measurement and monitoring devices are embedded. However, this still entails loss of service and extra support costs or the purchase of extra sets of network element devices to swap in and send to be upgraded.

In summary, embedded devices are ideal for large-scale, cost-effective measurement solutions, such as described in EP 1 152 570. Moreover, the embedding of measurement devices into routers is likely to be just a beginning; conceivably all network elements could eventually contain similar functionality. Unfortunately the utility of embedded devices will be severely limited without the ability to add new measurements, support new protocols and maximize the limited storage resources of those devices.

DISCLOSURE OF INVENTION

According to one aspect of this invention there is provided a communications network element comprising:

first circuitry for providing communications functionality for a network in which the element is to be incorporated;

second circuitry for providing monitoring functionality to monitor operation of the network in which the element is to be incorporated, in addition to any monitoring that is required by the first circuitry to provide the communications functionality, said second circuitry being partitioned into a plurality of sections of functionality, at least one section of functionality operating continuously, and at least one other section being capable of having the functionality thereof modified without halting operation of any other section of functionality; and storage for storing definitions of the monitoring functionality and for controlling operation of the second circuitry in accordance therewith, and for receiving and storing modified definitions of the monitoring functionality.

According to another aspect of this invention there is provided a method of monitoring operation of a communications network comprising:

implementing communications functionality in first circuitry of a network element;

implementing communications network monitoring functionality in second circuitry of the network element to monitor operation of a network in which the element is to be incorporated, in addition to any monitoring that is required by the first circuitry to provide the communications functionality, said second circuitry being partitioned into a plurality of sections of functionality, at least one section of functionality operating continuously, and at least one other section being capable of having the functionality thereof modified without halting operation of any other section of functionality; and storing definitions of the monitoring functionality in storage within the network element and controlling operation of the second circuitry in accordance therewith, and receiving and storing in the storage modified definitions of the monitoring functionality.

One embodiment of the invention takes the form of a hardware-based programmable device, using a Field Programmable Gate Array (FPGA) component or similar, that can be embedded within a network element such as a router. The device has relatively low cost, low power consumption and small size, thus conforming to the requirements for use in a system such as that described in EP 1 152 570, but also provides a level of flexibility normally associated with software-based solutions.

Such an embedded device may only have a limited amount of concurrent measurement ability, but being a predominantly hardware solution it is able to process incoming packets at line speed. As the device is reprogrammable, it can offer a wide selection of measurements through downloading of different or new measurements on demand. Furthermore, the same programming mechanism enables deployed devices to be upgraded with the same ease as existing software-based solutions.

Another embodiment of the invention takes the form of a software programmable device using a "network processor", that is a a software programmable processor with architectural features and/or special circuitry optimized for the particular application domain of packet processing. This device can be embedded within a network element such as a router. Network processors contain dedicated hardware, including for example processing engines with instruction sets dedicated to manipulating networking packets and optimized to run at line speed. As these processing engines are reprogrammable they can support a wide selection of measurements through downloading of different or new measurement algorithms on demand. Furthermore, the programming mechanism enables deployed devices to be upgraded with the same ease as existing software-based solutions.

BRIEF DESCRIPTION OF DRAWINGS

A method and apparatus in accordance with this invention, for monitoring a communications network, will now be described, by way of example, with reference to the accompanying drawings, in which.

DETAILED DESCRIPTION

Figure 1:
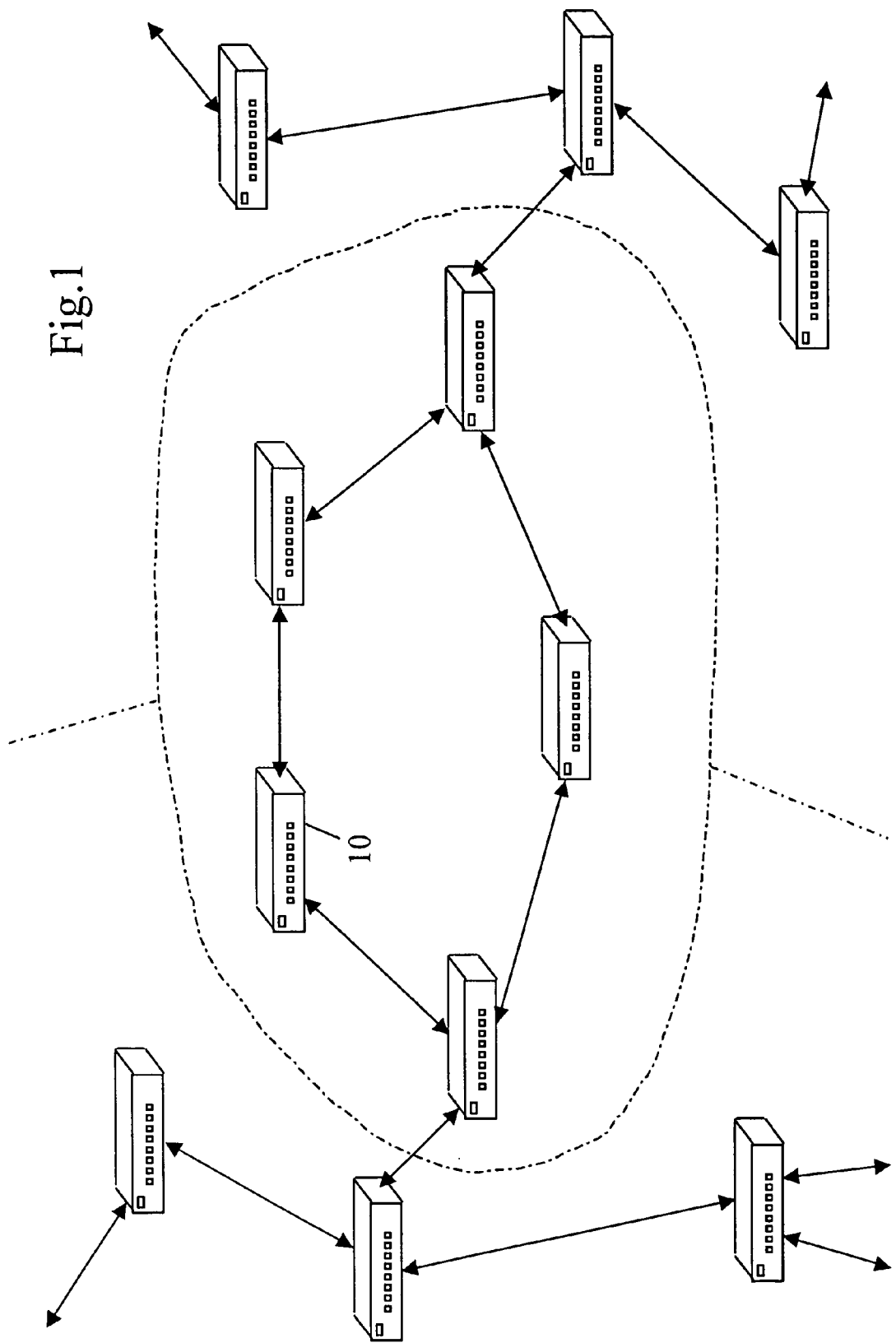
FIG. 1 shows a notional example of a communications network in which the present invention can be used.
Figure 2:
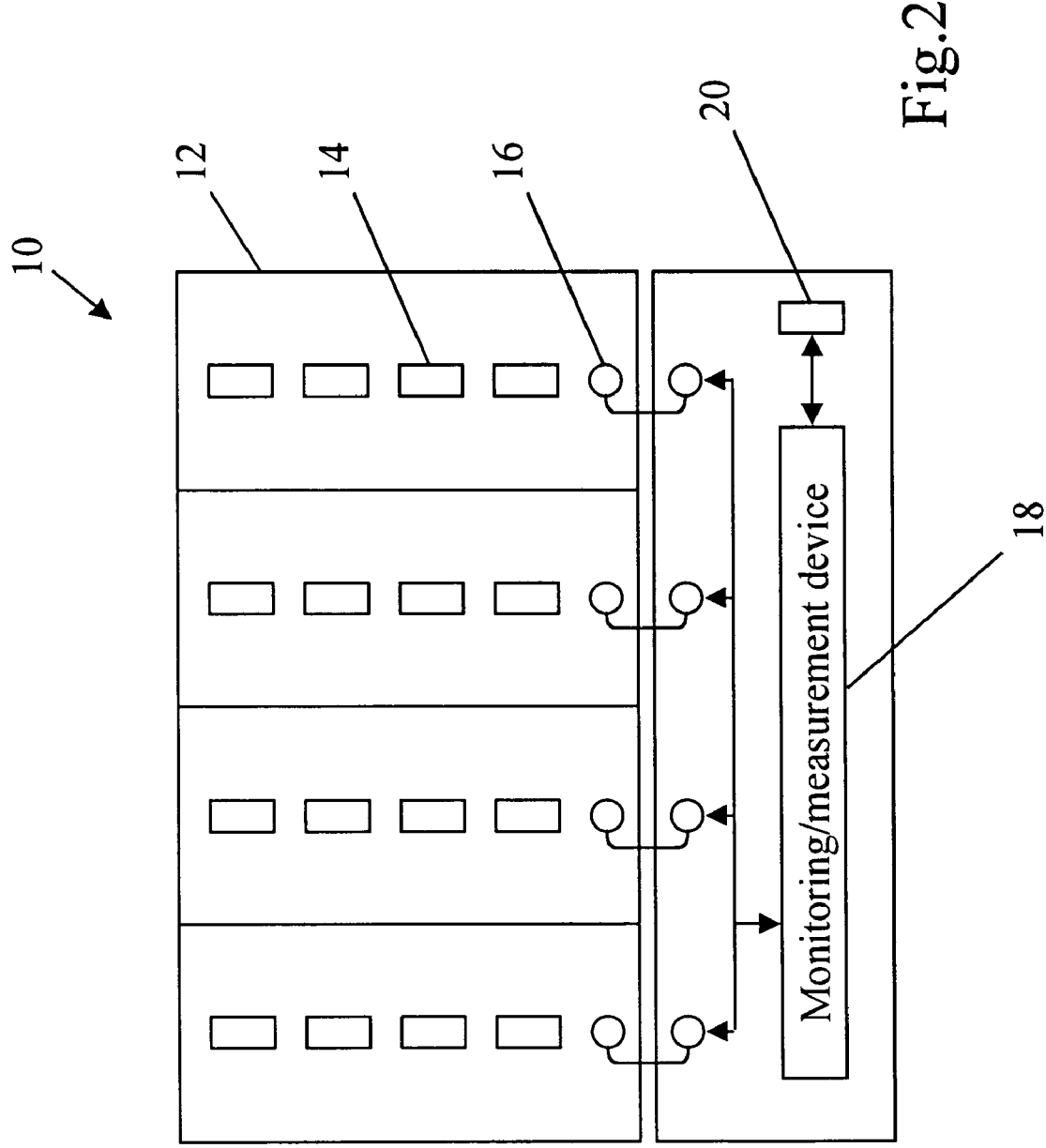
FIG. 2 is a block schematic diagram of a router forming part of the network shown in FIG. 1 and incorporating the invention.

Referring to FIG. 1, a notional fragment of the Internet is shown comprising multiple routers such as 10 interconnected to provide multiple (typically redundant) pathways for data packets traversing the network. Each data packet includes a header identifying an intermediate or final destination in the network for that packet. When a router receives a packet it inspects the header and uses current knowledge of the adjacent network topology, acquired by means of network protocols cooperatively implemented by the routers, to determine which of the adjacent routers the packet should next be forwarded to towards its ultimate destination. The router 10 is shown in more detail in FIG. 2 and contains a plurality of line or channel cards 12, each of which can handle transmission and reception of signals over several (e.g. four) data links implemented for example as optical fibre cables. To this end the line cards 12 have optical network connectors 14. The manner in which the router 10 provides its network operation functionality (e.g. receiving, examining and forwarding data packets) is conventional and need not be described further here.

Each line card also has a monitor port 16, for exchanging data, including for example packet headers, with a monitoring and measurement data processing device 18. This device additionally has a separate communication port 20 (e.g. an Ethernet port) through which the device 18 can receive instructions and transmit monitoring and measurement data it has derived in respect of packets handled by the router 10. Further details of the implementation of the router 10, and of specific measurement and monitoring functionality that may be implemented in the monitoring/measurement device 18, are given in the above-mentioned EP 1 152 570.

Figure 3:
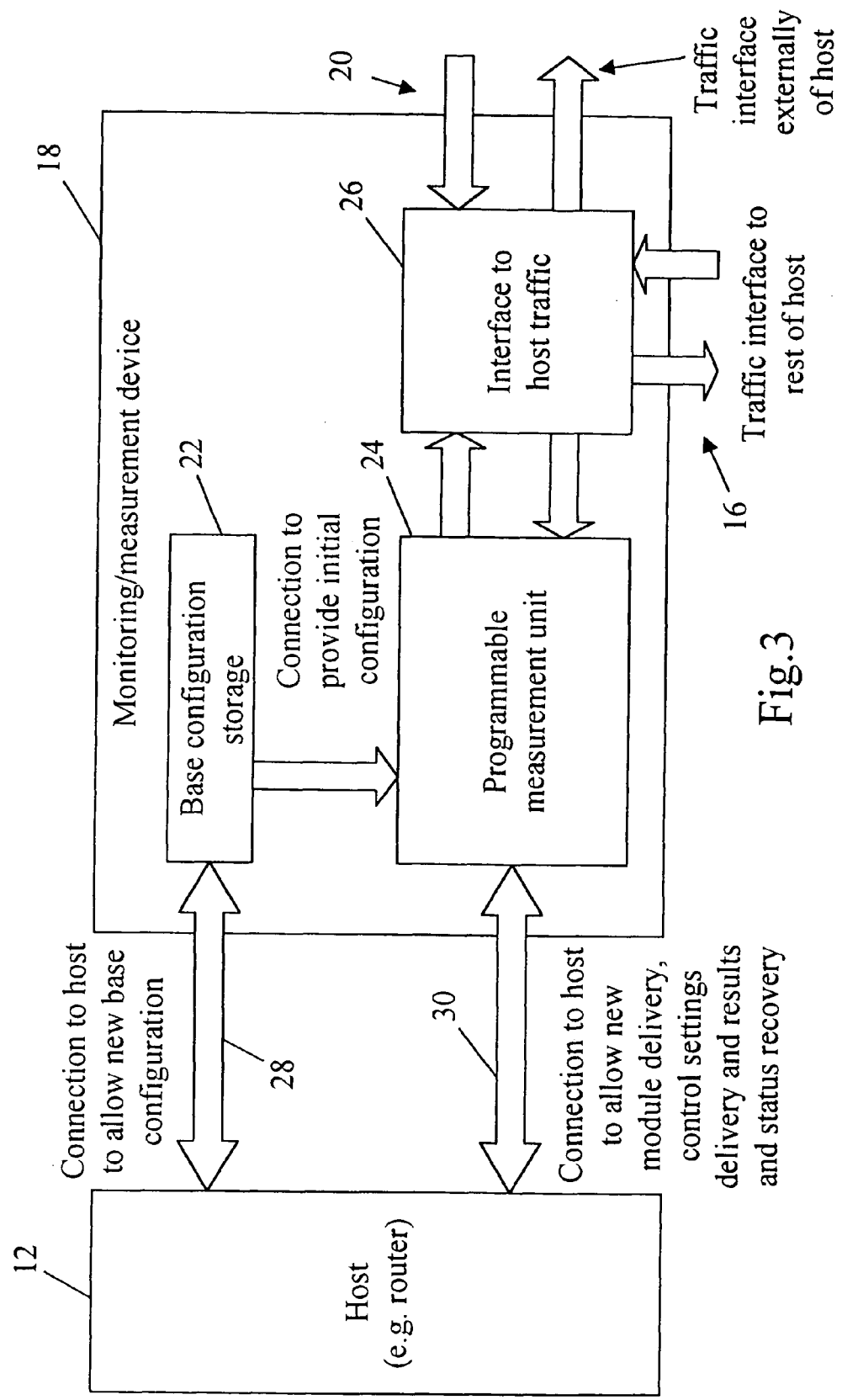
FIG. 3 is a block schematic diagram of a measurement device embedded in the router of FIG. 2.

The overall architecture of the monitoring/measurement device 18 is shown in more detail in FIG. 3. Referring to FIG. 3, the device 18 contains a non-volatile memory 22, a programmable measurement unit 24 (such as an FPGA) that provides monitoring and/or measurement functionality, and an interface unit 26 coupled to the monitor ports 16 and the communication port 20. Software program instructions stored in the measurement unit FPGA 24 control processing circuits also provided therein to provide desired functionality to monitor and/or measure parameters of the network packet data provided to the FPGA via the monitor ports 16. Additional connections 28 and 30 between the FPGA 24 and the router 12 enable the program instructions defining the functionality of the FPGA 24 to be modified and updated as required.

The base configuration for the FPGA 24 is stored in the non-volatile memory 22, and is thus always available in the event that, for example, a system restore is necessary. Complete upgrades can be applied by reprogramming this memory in situ using a dedicated cable or via a connection to a host controller. The initial base configuration stored in the memory 22 provides the main skeleton of functionality for the FPGA 24. For example, it contains code that allows new functionality modules to be downloaded and authenticated. In the example shown in FIG. 3 the code also includes a download controller and a section of memory (transit site) that provides a temporary storage location for the measurement modules.

In terms of defining the actual measurement/monitoring functionality of the measurement unit FPGA 24, the overall design of this unit is similar to that described in EP 1 152 570. The measurement unit 24 is connected to the host device's packet interface, for example the line card framer; it can inject active packets into the data stream leaving the host device 12 and it can also passively monitor arriving packet data. The measurement unit 24 could also be connected to the host device's shared backplane, for example a router's main packet bus. Connections can likewise be made to the host controller via the same backplane. In a router this controller would typically be a general-purpose processor that is used for the router's own configuration, command and control and for executing routing algorithms. A connection to the backplane also allows downloading of measurement modules and uploading of results for further processing and analysis. In the case of a router results can be extracted from the general-purpose processor by using existing standard mechanisms such as SNMP or via some form of inter-process communication such as CORBA, Java RMI or RPC.

The use of an FPGA for the measurement unit 24 is not essential, but does provide several practical advantages. FPGAs can, assuming the correct physical connections are established, be completely re-programmed in situ. This feature can be used to support wholesale upgrading of the device's features as well as initial bootstrapping of the system.

FPGAs that are now commercially available (such as the Virtex II series from Xilinx Inc.) support a process known as partial reconfiguration. This process allows pre-designated areas of the FPGA (sometimes known as modules) to be reprogrammed while the remainder of the chip is still actively functioning. Using this technique it is possible to load and unload different sections or blocks of program logic as required. The blocks of functionality can designed so that they can be changed 'on-the-fly' without impacting the rest of the FPGA's operation.

The blocks of functionality can be subdivided into typical tasks performed by a measurement unit. These tasks include filtering, counting, timestamping or packet classification. At a more abstract level different blocks of functionality could be produced to support different protocols or classes of measurement.

Simple configuration information can also be downloaded using the more traditional technique of setting predefined registers at known locations within the different measurement modules. Similarly results can be exported by setting and reading internal registers in a predefined area on the FPGA 24.

If the host 12 is, for example, a router, re-use of much of the existing router infrastructure for measurement control and results storage can also be made. This would reduce the overall cost of the device 18 when compared to traditional instrument or probe approaches that require on-system processing to control hardware and store results.

Initially the measurement functionality implemented may be part of a suite of tools that are provided with each device. Each measurement function is defined as a binary data file in an appropriate FPGA format. The measurement functionality can be loaded into the device using known mobile software object techniques. Examples of this process used for on-the-fly loading of measurement code are given in "Efficient Network Monitoring using Mobile Agents", A. Liotta, G. Knight & G. Pavlou, Research Note RN/99/6, Department of Computer Science, University College London, London, January 1999 and in "Exploiting Code Mobility in Decentralized and Flexible Network Management", M. Baldi, S. Gai & G. P. Picco, *First International Workshop on Mobile Agents 97* (*MA '97*), Berlin, Germany, April 1997, K. Rothermel & R. Popescu-Zeletin eds., *Springer-Verlag Lecture Notes on Computer Science* no. 1219, 1997, pp. 13-26. The issues of security and authentication associated with mobile code are also well understood and documented: "Mobile code security", A. D. Rubin & D. E. Geer, *IEEE Internet Computing*, November 1998; "Security issues in mobile code systems", D. M. Chess, in "Mobile Agents and Security", G. Vigna ed., *Lecture Notes in Computer Science* no. 1419, 1998, pp. 1-14, Springer-Verlag.

It is envisaged that it may become possible to produce modules on site adjacent the router 10; this might be done, for example, using a high-level programming language or a graphical tool to provide a conveniently formatted measurement description that can be converted and compiled into the necessary binary data.

Figure 4:
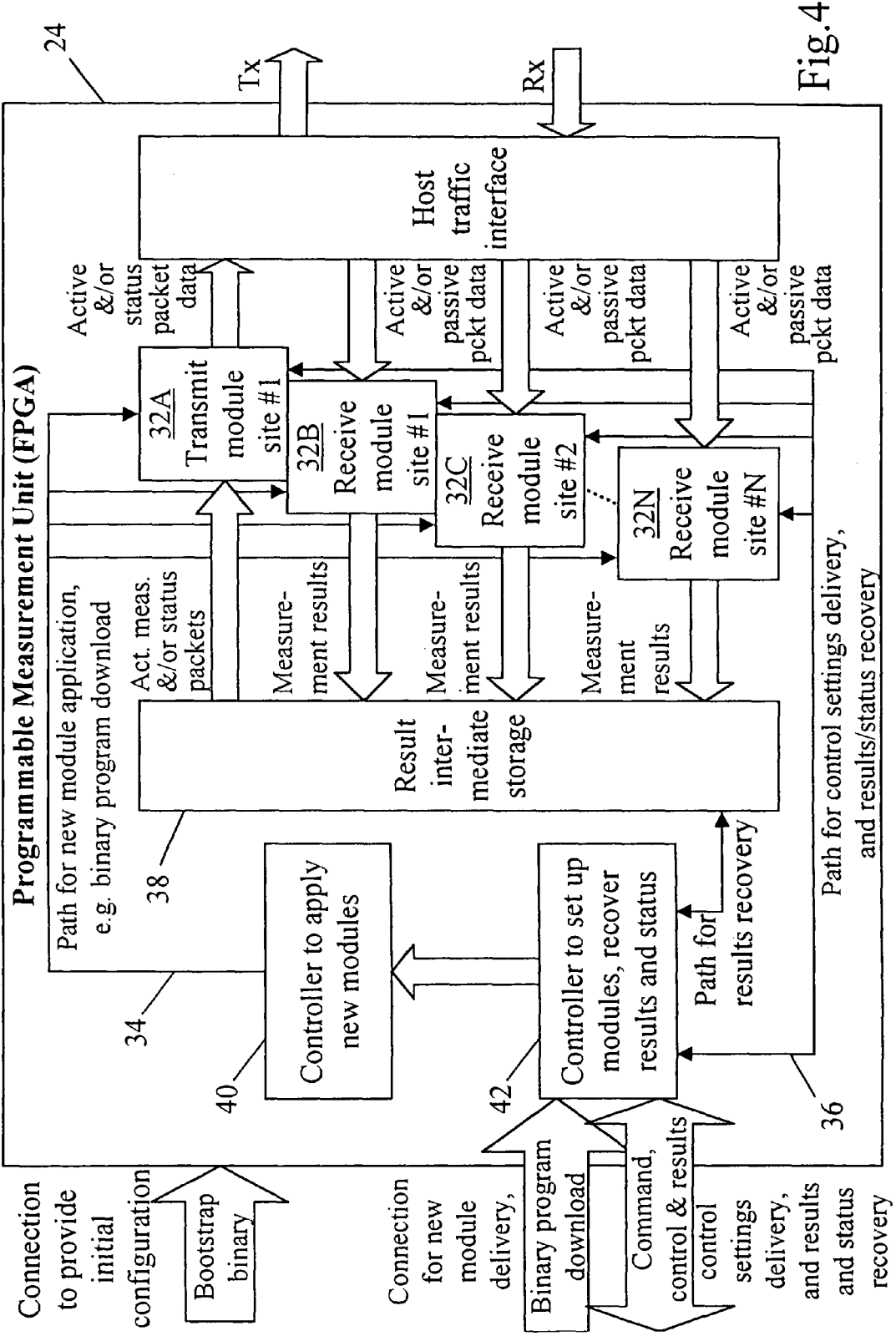
FIG. 4 is a block schematic diagram of a programmable measurement unit forming part of the measurement device of FIG. 3.

FIG. 4 shows the internal architecture of an exemplary implementation of the measurement unit FPGA 24. With a sufficiently large FPGA it is possible to allocate several respective areas 32A, 32B, 32C, . . . 32N so that more than one measurement can be run concurrently. The actual number of such areas available depends upon the size of the FPGA and the number of logic gates that the functions of the areas 32A to 32N require. The FPGA can be initialized with the modules 32A to 32N either empty or with some or all containing a default set of measurement functionalities. Interfaces or connections 34 and 36 between these zones and the rest of the FPGA are also predefined. The connections include paths for outbound results, for inbound packet data intended for passive traffic monitoring, and for outbound packet data for active (intrusive) measurements. Results are stored in an intermediate memory 38 so that if the host's main processor is busy the limited storage within each measurement block or section is not exhausted and information is not lost before the results are forwarded.

Program modules are stored on the host device's central general-purpose processor or on a centralized, possibly dedicated, control server. The measurement modules are downloaded to each measurement unit FPGA in binary format, wrapped within normal packets traveling through the network, or if local, through the host system's backplane or bus. A combination of local and network transmission can be used if an external server is being used to store the measurement modules.

The FPGA's partial reprogramming mechanism is then used, under the control of a controller 40, to load the measurement module into a predefined transit area on the FPGA. Once the download is complete and the new measurement code has successfully passed security and authentication checks, the measurement module is hot-swapped into the appropriate receiving site 32A to 32D and executed, under the supervision of a second controller 42. Any existing code at that site is discarded once any remaining results generated by it have been retrieved. The new measurement functionality is now being executed and will start to place results into the intermediate results storage area 38.

An alternative method of partial reconfiguration is to use a soft-core processor, i.e. standard general-purpose microprocessor functionality implemented using the FPGA's own logic. Obviously, a soft-core processor requires software programming will typically run more slowly and consume more resources (FPGA gates) than dedicated logic. However, for general tasks the added flexibility of true software may be valuable. Additionally a hybrid approach may also be possible using the combination of a soft-core processor and more traditional programmed logic.

Recently-introduced FPGA device technology incorporates a built-in general-purpose processor as well as a block of normal FPGA logic gates. Such a device is likely to be more costly than standard FPGAs. However, it does offer an alternative path for programmable measurement devices, supporting a hybrid hardware and software approach to implementing highly flexible cost-effective embedded measurement systems. A system-on-a-chip solution might be applicable to network-edge network elements that do not have any existing support infrastructure like that typically found on a router. Command-and-control and result correlation functions will always be required and without access to any external infrastructure, an on-device CPU may in some circumstances be economically viable in the context of the host system.

The programmable measurement unit 24 shown in FIG. 3 can also be implemented using a network processor rather than an FPGA. A network processor is a hardware unit designed to be controlled by programmable software instructions, with an architecture optimized for packet processing at very high rates.

Network processors typically have several separate processing elements, which have individual program store memories, and an overall general-purpose processor which acts as a system controller with its own program, providing management and control over the operation of the processing elements.

The functionality required in the measurement device 18 can be subdivided into distinct individual tasks commonly performed by any network measurement unit. These tasks include filtering, counting, timestamping or packet classification. At a more abstract level different blocks or sections of functionality could be produced to support different protocols or classes of measurement.

Simple configuration information can also be downloaded using the more traditional technique of setting predefined registers at known locations within memory accessible by the different processing elements acting as measurement modules. Similarly results can be exported by setting and reading memory locations in a predefined area of the memory.

As with the FPGA embodiment shown in FIG. 4, the measurement functionality implemented initially may be part of a suite of tools that are provided with each device. Each measurement function is defined as a binary data file in an appropriate network processor processing element format. The measurement functionality can be loaded into the device using known mobile software object techniques, as described in the references cited above. Likewise, it may become possible to produce modules on site adjacent the router 10, for example using a high-level programming language or a graphical tool to provide a conveniently formatted measurement description that can be converted and compiled into the necessary processing element binary data.

Figure 5:
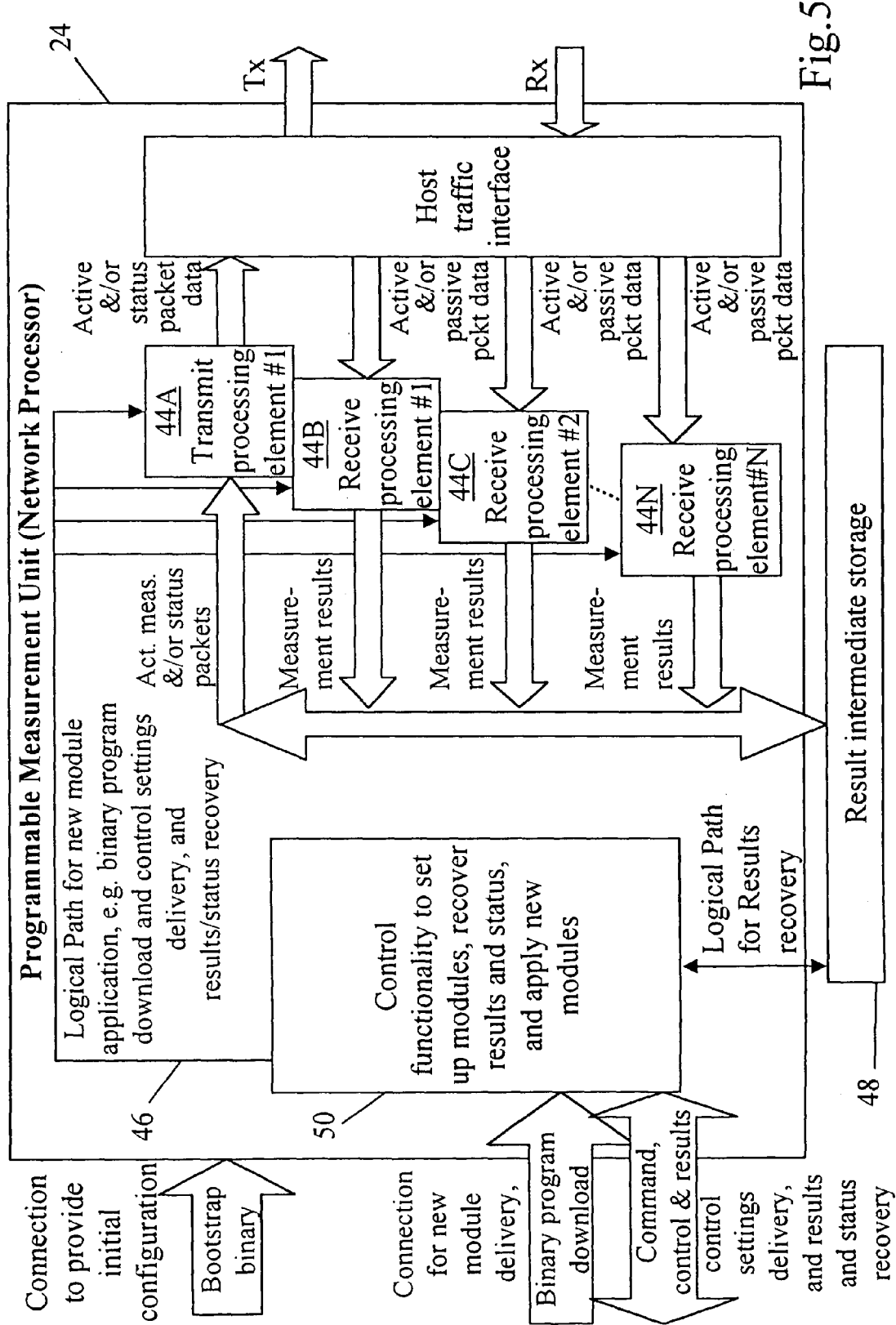
FIG. 5 is a block diagram of another implementation of a programmable measurement unit forming part of the measurement device of FIG. 3.

FIG. 5 shows the internal architecture of an exemplary implementation of the measurement unit 24 using a network processor. With a large enough network processor, containing a sufficient number of processing elements, it is possible to allocate several respective processing elements 44A, 44B, 44C, . . . 44N so that more than one measurement can be run concurrently. The actual number of such areas available depends upon the internal architecture of the particular network processor being used. The network processor can be initialized with the processing elements 44A to 44N either unallocated or with some or all allocated to a default set of measurement functionalities. Logical interfaces or connections 46 between the processing elements and the rest of the network processor are also predefined. The connections include paths for outbound results, for inbound packet data intended for passive traffic monitoring, and for outbound packet data for active (intrusive) measurements. Results are stored in a memory (RAM) 48 coupled to the network processor, so that if the host's main processor is busy the limited storage within each processing element is not exhausted and information is not lost before the results are forwarded.

Program modules are stored on the host device's central general-purpose processor or on a centralized, possibly dedicated, control server. The program modules are downloaded to each measurement unit processing element in binary format, wrapped within normal packets traveling through the network, or if local, through the host system's backplane or bus. A combination of local and network transmission can be used if an external server is being used to store the measurement modules.

Logical control functionality 50, implemented by appropriate programming of the network processor's general-purpose processor, coordinates downloading of the new measurement module binary program files into a "transit" area in the logical controller memory space. Once the download is complete and the new measurement code has successfully passed security and authentication checks, each new measurement module is loaded into the appropriate processing element 44A to 44N and executed, under the supervision of the logical controller 50. Any existing code for that processing element is discarded once any remaining results generated by it have been retrieved. The new measurement functionality is now being executed and will start to place results into the intermediate results memory 48.

The invention claimed is:

1. A communications network element comprising:
   first circuitry configured for providing network communications for a network in which the element is to be incorporated;
   second circuitry configured to monitor operation of the network in which the element is to be incorporated, said second circuitry being partitioned into a plurality of functional blocks, at least one functional block configured to operate continuously, wherein the network element is configured to reprogram at least one other functional block without halting operation of any other functional block; and
   a connection to the network for receiving a measurement module, containing instructions for reprogramming the at least one other functional block, wrapped within packets traveling through the network;
   a memory configured to store the measurement module containing instructions for reprogramming the at least one other functional blocks,
   each at least one other functional block comprising:
      a transit memory configured for temporary storage of the measurement module and further configured for a security and authentication verification of the measurement module stored within the transit memory; and
      a processing element configured for receiving and running the measurement module upon successful security and authentication verification of the measurement module.

2. The network element of claim 1, including a controller configured for communicating monitoring results obtained by operation of the second circuitry.

3. The network element of claim 1, wherein the second circuitry comprises field programmable gate array logic gates.

4. The network element of claim 1, wherein the second circuitry comprises a network processor.

5. A method of monitoring operation of a communications network comprising:
   implementing network communications in first circuitry of a network element;
   monitoring operation of the communications network using second circuitry of the network element,
   partitioning the second circuitry into a plurality of functional blocks, at least one functional block configured to operate continuously, and at least one other functional block configured to be reprogrammed without halting operation of any other functional block;
   receiving a measurement module, containing instructions for reprogramming the at least one other functional block, wrapped within packets traveling through the network;
   storing the measurement module, containing instructions for reprogramming the at least one other functional blocks, in a memory of the network element,
   wherein reprogramming the at least one other functional block comprises:
      loading the measurement module into a transit memory of the functional block;
      performing a security and authentication verification of the measurement module stored within the transit memory of the functional block;
      upon successful security and authentication verification of the measurement module, loading the measurement module into a processing element of the functional block.

6. The method of claim 5, further comprising communicating externally of the network element monitoring results obtained by operation of the second circuitry.

7. The method of claim 5, wherein the second circuitry comprises field programmable gate array logic gates.

8. The method of claim 5, wherein the second circuitry comprises a network processor.

* * * * *